(12) United States Patent
Durairaj et al.

(10) Patent No.: US 11,989,395 B1
(45) Date of Patent: May 21, 2024

(54) INTERFACE MODIFICATION SYSTEMS AND METHODS

(71) Applicant: United Services Automobile Association (USAA), San Antonio, TX (US)

(72) Inventors: Ravi Durairaj, San Antonio, TX (US); Rachel Michelle Ballew, San Antonio, TX (US); Natalie Kay Helsen, Murphy, TX (US); Eric David Schroeder, San Antonio, TX (US); Amber Nicole Sodikov, Plano, TX (US); David Joaquin Harris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/726,169

(22) Filed: Apr. 21, 2022

Related U.S. Application Data (60) Provisional application No. 63/177,762, filed on Apr. 21, 2021.

(51) Int. Cl.
| | |
|---|---|
| *G06F 3/0484* | (2022.01) |
| *G06F 3/0482* | (2013.01) |
| *G06F 40/143* | (2020.01) |
| *G06F 40/166* | (2020.01) |

(52) U.S. Cl.
CPC .......... *G06F 3/0484* (2013.01); *G06F 3/0482* (2013.01); *G06F 40/143* (2020.01); *G06F 40/166* (2020.01)

(58) Field of Classification Search
CPC .... G06F 3/0484; G06F 3/0482; G06F 40/143; G06F 40/166
See application file for complete search history.

(56) References Cited

U.S. PATENT DOCUMENTS

| | | | | |
|---|---|---|---|---|
| 5,566,291 | A * | 10/1996 | Boulton | G09B 5/065 |
| | | | | 715/709 |
| 7,827,487 | B1 * | 11/2010 | Nickerson | G06F 16/95 |
| | | | | 715/790 |
| 8,713,438 | B1 * | 4/2014 | Broniek | G06F 40/169 |
| | | | | 715/764 |
| 9,244,510 | B1 * | 1/2016 | Conrad | G06F 11/30 |
| 10,365,798 | B1 * | 7/2019 | El Kaissi | G06Q 30/0282 |
| 10,838,585 | B1 * | 11/2020 | Douglas | G06F 3/0482 |
| 10,921,951 | B1 * | 2/2021 | Rampoldi-Hnilo | |
| | | | | G06F 3/04883 |
| 11,308,531 | B2 * | 4/2022 | Lewis | G06Q 30/0282 |
| 2005/0154557 | A1 * | 7/2005 | Ebert | G06F 11/3438 |
| | | | | 702/182 |

(Continued)

*Primary Examiner* — Tuyetlien T Tran
(74) *Attorney, Agent, or Firm* — Fletcher Yoder, P.C.

(57) ABSTRACT

An interface modification system includes one or more processors configured to provide, to one or more client devices, a graphical representation of a web application. The graphical representation has a first layer including one or more components of the web application and a second layer configured for secondary interactions with the one or more components. The one or more processors are configured to receive, via the second layer and from the one or more client devices, feedback associated with the one or more components. Additionally, the one or more processors are configured to generate an incident record including the feedback and store the incident record in an incident database.

18 Claims, 5 Drawing Sheets

(56) References Cited

U.S. PATENT DOCUMENTS

| | | | | |
|---|---|---|---|---|
| 2010/0037166 A1* | 2/2010 | Chandrasekar | ....... | G06F 3/0481 |
| | | | | 715/764 |
| 2012/0123823 A1* | 5/2012 | Finkelstein | ........ | G06Q 30/0203 |
| | | | | 705/7.32 |
| 2012/0317545 A1* | 12/2012 | Chandra | ................... | G06F 8/70 |
| | | | | 717/110 |
| 2012/0324334 A1* | 12/2012 | Leper | .................... | G06F 16/957 |
| | | | | 715/234 |
| 2015/0032509 A1* | 1/2015 | Fuentes | ................... | G06F 16/00 |
| | | | | 705/7.32 |
| 2015/0347367 A1* | 12/2015 | Berke | ................... | G06F 40/169 |
| | | | | 715/771 |
| 2016/0291937 A1* | 10/2016 | Khanna | ................... | G06F 9/451 |
| 2017/0337168 A1* | 11/2017 | Kunze | ................... | H04L 67/01 |
| 2017/0371688 A1* | 12/2017 | Kim | ................... | G06F 9/44536 |
| 2020/0098019 A1* | 3/2020 | Doti | ......................... | H04W 4/60 |
| 2021/0304142 A1* | 9/2021 | Bar-on | ................. | G06Q 10/101 |
| 2022/0161145 A1* | 5/2022 | Hardee | ................. | A63F 13/655 |

\* cited by examiner

INTERFACE MODIFICATION SYSTEMS AND METHODS

CROSS-REFERENCE TO RELATED APPLICATION

This application claims priority to and the benefit of U.S. Provisional Application No. 63/177,762, entitled "INTERFACE MODIFICATION SYSTEMS AND METHODS," filed Apr. 21, 2021, which is hereby incorporated by reference in its entirety for all purposes.

BACKGROUND

Interfaces, such as graphical user interfaces, may communicate information to users to allow viewing of and interaction with such information. In some instances, the interfaces may include features that are not intuitive or that are overly complicated. For example, the interfaces may include too much information or may be organized in a manner that is difficult to understand. It is now recognized that there is a need to improve such interfaces to facilitate viewing and interaction with the information.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an interface modification system includes one or more processors configured to provide, to one or more client devices, a graphical representation of a web application. The graphical representation has a first layer including one or more components of the web application and a second layer configured for secondary interactions with the one or more components. The one or more processors are configured to receive, via the second layer and from the one or more client devices, feedback associated with the one or more components. Additionally, the one or more processors are configured to generate an incident record including the feedback and store the incident record in an incident database.

In certain embodiments, a method includes providing, to one or more client devices, a graphical representation of a web application. The graphical representation includes a first layer including one or more components of the web application and a second layer configured for secondary interactions with the one or more components. The method also includes receiving, via the second layer and from the one or more client devices, feedback associated with the one or more components, generating an incident record including the feedback, and storing the incident record in an incident database.

In certain embodiments, a non-transitory computer-readable medium includes computer readable instructions, that when executed by one or more processors, causes the one or more processors to perform operations including providing, to one or more client devices, a graphical representation of a web application. The graphical representation includes a first layer including one or more components of the web application and a second layer configured for secondary interactions with the one or more components. The operations also include receiving, via the second layer and from the one or more client devices, feedback associated with the one or more components, generating an incident record comprising the feedback, and storing the incident record in an incident database.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to a web application system, and more particularly to an interface modification system of the web application system that provides a graphical representation (e.g., a graphical user interface (GUI)) of a web application to client devices, receives feedback associated with the web application from the client devices, and generates and stores an incident record including the feedback. For example, the graphical representation may include a first layer that displays components of the web application, such that a user may view and/or interact with the components via the first layer. In certain embodiments, the first layer may allow primary interactions with the components (e.g., the first layer may provide a primary/central purpose for each component). Additionally, the graphical representation may include a second layer configured for secondary interactions with the components, such as providing feedback associated with the components. For example, the second layer may include, for each component, one or more feedback mechanisms (e.g., a data entry field configured to receive a text entry, a rating selector configured to receive a rating, a drop-down menu, and/or other suitable feedback mechanisms).

In an example embodiment, the graphical representation may depict a component, via the first layer, that allows a user to filter data related to the web application, such as data stored by the web application and/or data generated by the web application. A user viewing the graphical representation may not understand how to use the filtering mechanism and/or may have an idea to improving a functionality of the filtering mechanism. The user may provide, via a feedback mechanism of the second layer, feedback including a comment explaining that they do not understand how to use the filtering mechanism and/or their thoughts on a potential improvement to the filtering mechanism. The interface modification system may receive the feedback and generate and store an incident record including the feedback.

In certain embodiments, the interface modification system may identify a modification to the graphical representation based on the feedback, such as via machine learning. The interface modification system may generate and store a ticket indicative of instructions to implement the modification, such that a developer of the web application and/or other technical personnel may implement the modification based on the ticket. Thereafter, the interface modification system may generate and/or provide an additional graphical representation of the web application including the modification. In some embodiments, the interface modification may automatically implement the modification to the graphical representation without input from a developer or other technical personnel.

In certain embodiments, the interface modification system may provide a GUI including components of the web application that are configured to display information of the web application and/or that are configured for interaction with the web application. The interface modification system may receive input data indicative of user interaction with the GUI and determine an incident associated with the web application based on the data. For example, the input data may indicate that a user is switching between tabs of the GUI (e.g., between tabs of one component and/or tabs corresponding to multiple components) without taking an additional action, such as interacting with a component in a particular tab. Accordingly, the interface modification may determine that information in the tabs is confusing to the user, that the GUI does not include adequate instructions regarding the tabs, or another incident based on the input data. The interface modification system may generate and store an incident record indicative of such an incident, such that the incident may be resolved by a developer, other technical personnel, and/or by the interface modification system itself. Accordingly, the systems and methods described herein may facilitate modifying an interface based on user feedback to improve the functionality and ease of use of the interface.

Figure 1:
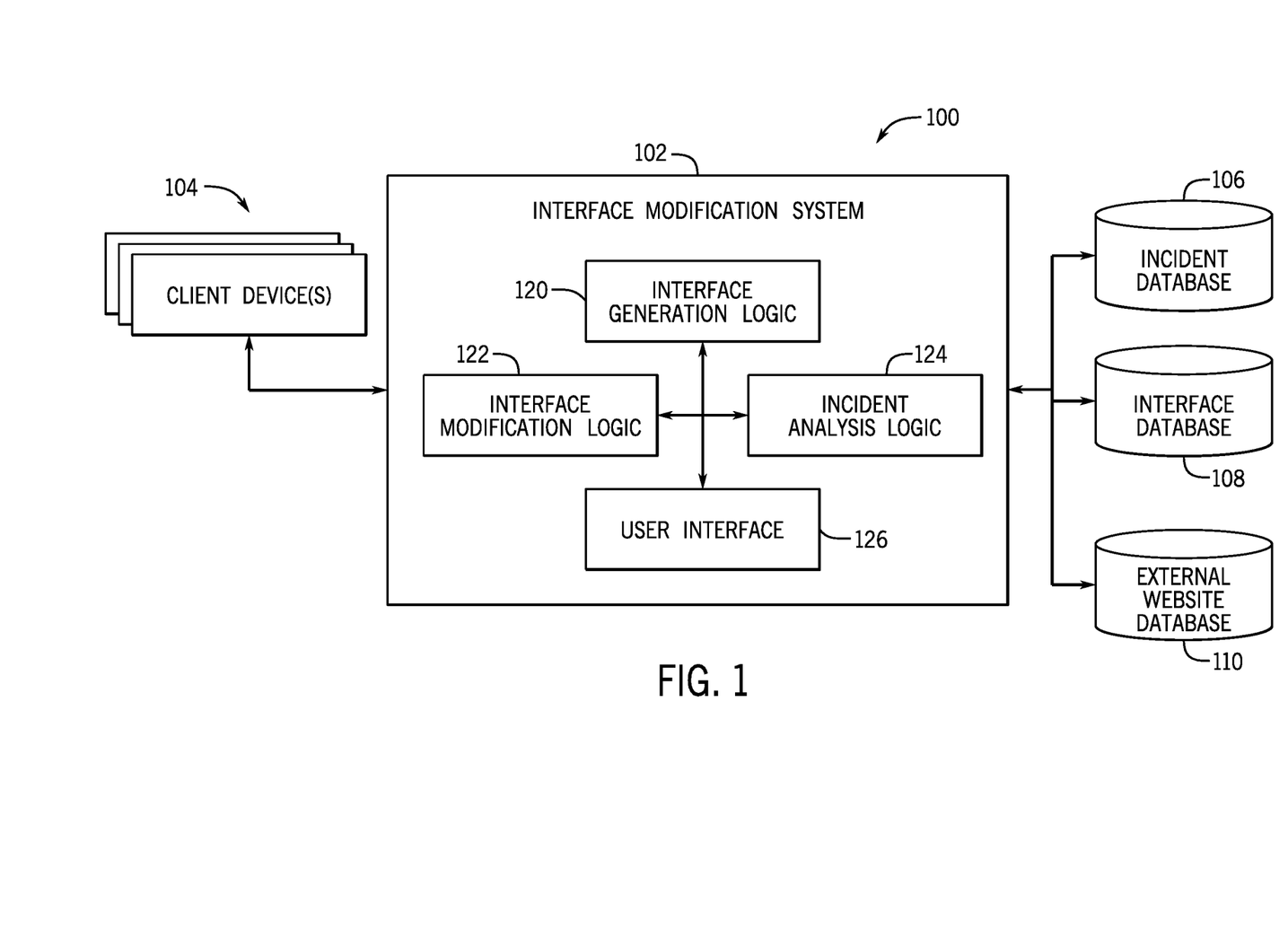
FIG. 1 illustrates a block diagram of a web application system including an interface modification system configured to provide a web application and receive feedback corresponding to the web application, in accordance with embodiments described herein.

With the foregoing in mind, FIG. 1 illustrates a block diagram of a web application system 100 including an interface modification system 102 that may provide a web application to client devices 104 and receive feedback corresponding to the web application. Additionally, the web application system 100 may include an incident database 106, an interface database 108, and/or an external website database 110. In certain embodiments, the web application system 100 may include one or more of the client devices 104. In some embodiments, the interface modification system 102 may include one or more of the client devices 104, the incident database 106, the interface database 108, and/or the external website database 110.

As illustrated, the interface modification system 102 includes an interface generation logic 120, an interface modification logic 122, an incident analysis logic 124, and a user interface 126. In some embodiments, the interface generation logic 120, the interface modification logic 122, the incident analysis logic 124, and/or the user interface 126 may be omitted from the interface modification system 102. The interface modification system 102 may provide, via the interface generation logic 120 and/or the interface modification logic 122, a GUI (e.g., a graphical representation, an interface) of a web application to the client devices 104. For example, in response to receiving a request for the GUI from a particular client device 104, the interface generation logic 120 may generate a representation of the GUI, and the interface modification system 102 may transmit the representation of the GUI to the client device 104.

In some embodiments, the interface modification system 102 and/or the interface generation logic 120 may retrieve the GUI from the interface database 108 and/or the external website database 110 and transmit the GUI to the client device 104 in response to receiving the request. The interface database 108 may include interfaces (e.g., GUIs, graphical representations) corresponding to certain web applications and/or interfaces of various types (e.g., tabbed interfaces, windowed interfaces), and the interface modification system 102 may select a particular interface from the interface database 108 based on the request received from the client device 104 (e.g., the request may indicate a particular web application and/or a type of interface). The external website database 110 may include a listing of external websites corresponding to web applications, such that the interface modification system 102 may determine the GUI to be provided to the client device 104 based on an external website corresponding to the particular web application.

The client devices 104 may display the GUI of the web application for viewing by users of the client devices 104. The GUI may display components of the web application for viewing and/or interaction by the users. For example, the GUI may include a first layer displaying the components and that is configured for primary interactions between the users and the components. Such primary interactions may generally correspond to a primary function (e.g., purpose) of the components. For example, a primary function of a data filter may be to allow the user to filter and select data provided by the web application. Additionally, the GUI may include a second layer configured for secondary interactions with the components. The secondary interactions may include providing feedback regarding the components displayed via the first layer. For example, the second layer may include one or more feedback mechanisms, such as a data entry field configured to receive a text entry, a rating selector configured to receive a rating, a drop-down menu, and/or other suitable feedback mechanisms.

The client device 104 may display the GUI, and a user of the client device 104 may perform primary interactions with the web application via the first layer and secondary interactions with the web application via the second layer. In certain embodiments, the GUI may be configured to allow the user to toggle between the first layer and second layer. In some embodiments, the GUI may default to displaying the first layer to the user, and the user may select an option that displays the second layer, thereby allowing the user to provide feedback for a component initially displayed via the first layer. The second layer may not be visible while the first layer is displayed, and/or while the first layer is being used (e.g., interacted with) by the user. Additionally or alternatively, the second layer may be overlaid onto the first layer when prompted/selected by the user, such that the user may see the feedback mechanism for a particular component overlaid on the particular component and/or overlaid on the first layer generally. For example, a user may provide an input indicating that they wish to provide feedback regarding a particular component, and in response, the GUI (e.g., the interface modification system 102 via the GUI) may display the second layer including the feedback mechanism for that particular component.

The interface modification system 102 may receive the feedback provided by the user, such as via the interface modification logic 122 (e.g. at the interface modification logic 122). The feedback may include an incident for the particular component selected or identified by the user, and for which the feedback mechanism was provided in the second layer of the GUI. In some embodiments, the feedback may correspond to multiple components. The feedback may include a potential issue with the component, a potential improvement to the display and/or function of the component, a comment, a rating, and/or other suitable feedback.

The interface modification system 102, such as via the interface modification logic 122 or the incident analysis logic 124, may generate an incident record indicative of the feedback. The record may include the feedback, information identifying the component, information about the user that provided the feedback (e.g., name, title, rank, age, location), information regarding the client device 104 of the user (e.g., type, brand, serial number, and/or a time and date that the feedback was provided). The interface modification system 102 may store the incident record in the incident database 106, which may be a repository storing incident records for the particular web application corresponding to the feedback and/or a repository for incident records corresponding to multiple, related web applications.

In certain embodiments, the user interface 126 may display the incident record for viewing by a user of the interface modification system 102, such as a developer of the web application and/or other technical personnel (e.g., personnel of a company's IT department). For example, the user interface 126 may provide an interface allowing the user to retrieve and/or view the incident record. The user may then determine a modification to the GUI and implement the modification, thereby addressing the feedback provided by the user of the client device 104. The user interface 126 may include an electronic display to provide a visual representation of information, for example, via a GUI, an application interface, text, a still image, and/or video content. The user interface 126 may be configured to receive inputs from a user (e.g., the developer of the web application and/or other technical personnel).

Additionally or alternatively, the incident analysis logic 124 may analyze the incident identified based on the feedback (e.g., as indicated in the incident record) to determine the modification to the GUI. For example, using machine learning, the incident analysis logic 124 may determine that a particular modification to the first layer of the GUI would address the feedback, such as replacing a component of the GUI, adding or removing a component, modifying a font or size of text in the component, modifying an interactive function (e.g., a drop-down menu, a free text field, a rating selector) of a component, or another suitable modification. In certain embodiments, the interface modification system 102, via the incident analysis logic 124, may train and/or enhance a machine learning model based on the feedback from the user (e.g., the developer of the web application and/or other technical personnel) received via the user interface 126.

For example, some processes (e.g., analyzing feedback received from one or more users of the client devices 104, determining modifications to the GUI, analyzing the input data indicative of user interactions described below) described herein may be performed by machine learning circuitry using the feedback, the incident records, and/or input from a user. The machine learning circuitry (e.g., circuitry used to implement machine learning algorithms or logic) may access the mapping data and the additional information to identify patterns, correlations, or trends associated with the data. The feedback may be sourced from a multitude of diverse client devices 104 and users of the client devices 104, and new data patterns not previously attainable based on feedback without machine learning may emerge. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuitry may implement different forms of machine learning. In some embodiments, a supervised machine learning may be implemented. In supervised machine learning, the mathematical model of the feedback and modifications to the GUI contains both the inputs and the desired outputs. The feedback and modifications to the GUI is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. common feedback between two client devices 104, common modifications for the same or different GUIs) are.

Additionally and/or alternatively, in some situations, it may be beneficial for the machine-learning circuitry to utilize unsupervised learning (e.g., when particular output types are not known). Unsupervised learning algorithms take feedback that contains only inputs, and find structure in the data, like grouping or clustering of feedback (e.g., types of feedback, common subject matters within feedback). The algorithms, therefore, learn from test data that has not been labeled, classified or categorized. Instead of responding to feedback, unsupervised learning algorithms identify commonalities in the feedback and react based on the presence or absence of such commonalities in each new piece of feedback.

Cluster analysis is the assignment of a set of observations (e.g., feedback) into subsets (called clusters) so that observations within the same cluster are similar according to one or more predesignated criteria, while observations drawn from different clusters are dissimilar. Different clustering techniques make different assumptions on the structure of the feedback, often defined by some similarity metric and evaluated, for example, by internal compactness, or the similarity between users of the same cluster, and separation, the difference between clusters. Predictions or correlations may be derived by the machine learning circuitry. For example, groupings and/or other classifications of the feedback may be used to identify potential modifications to GUIs. The predictions may be provided to downstream applications, which may perform actions based upon the predictions. The actions that are performed may be mediated through a controller, either directly or through a coupled secure system, that has access to the feedback.

After determining the modification to the GUI, such as based on user input provided via the user interface 126 and/or via incident analysis logic 124, the interface modification logic 122 may implement the modification to the GUI to generate an additional, modified representation of the GUI (e.g., an additional graphical representation of the web application). The additional representation of the GUI may include the first layer and the second layer of the previous representation, along with the modification to the GUI described above. The interface modification system 102 may provide (e.g., send, transmit) the additional representation of the GUI to the client devices 104, which may then display the GUI for viewing and/or interactions by the users of the client devices 104. The users may provide additional feedback regarding the same component and/or other components of the GUI, and the interface modification system 102 may generate additional incident records indicative of the feedback and/or determine/implement additional modifications to the GUI that address the feedback, such that the process described herein may be performed iteratively by the interface modification system 102 until users of the client devices 104 stop providing feedback.

In certain embodiments, the interface modification system 102 may determine whether certain feedback has been received from a threshold number of the client devices 104 and/or a threshold number of users of the client devices 104, and in response, generate the incident record. The interface modification system 102 may determine the threshold number of client devices 104 and/or the threshold number of users based on a type of the feedback, a significance of the feedback, and/or an amount of the client devices 104 generally.

Additionally or alternatively, the interface modification system 102 may aggregate the feedback received from the client devices 104. The interface modification system 102 may determine whether feedback received from multiple (e.g., 2, 3, 4, 5, 6, 10, 15, 20, 50, 100, 1000) client devices 104 is exceeds a threshold level of similarity, and in response, generate the incident record. The interface modification system 102 may determine the threshold level of similarity based on a type of the feedback, a significance of the feedback, and/or an amount of the client devices 104 generally. In some embodiments, the interface modification system 102 may use machine learning to determine whether feedback received from multiple client devices 104 exceeds the threshold level of similarity, such as by comparing text within the multiple instances of feedback.

In certain embodiments, the interface modification system 102 may receive input data indicative of user interactions with the GUI from the client devices 104 and identify an incident based on the input data. For example, the input data may indicate selections (e.g., clicking or otherwise selecting) of certain components of the GUI, selections of the portions of the components, time periods between two or more user interactions, scrolling, and/or other types of user interactions with the GUI. In certain embodiments, the input data may include data from a secondary device, such as a smartphone, a smartwatch, and/or a webcam. The input data from such devices may include heart rate data, motion data, user interactions on the smartphone and/or the smartwatch, and other data that may be obtained from such devices.

The interface modification system 102 may determine an incident based on the input data, such as a component of the GUI, a portion of a component, and/or another aspect of the GUI that may not be optimized for user interaction and/or for which the user may have an issue. By way of example, the input data may indicate that the user is clicking/switching between multiple tabs without taking an additional action in a particular tab. Additionally, the input data may indicate a time period that the user views each tab (e.g., a time period between two or more instances of user interactions). The interface modification system 102, via the incident analysis logic 124, may determine that there is a potential issue with the one or more of the tabs and generate and store an incident record indicative of the incident. In certain embodiments, the interface modification system 102 may determine that there is an incident based on the time period exceeding a threshold amount of time. The interface modification system 102 may determine the threshold amount of time based on one or more types of user interactions associated with the multiple instances of user interaction, a length of the particular time period, and/or a user input. A user of the interface modification system 102 may review the incident record to determine if the incident is appropriate (e.g., valid) and/or may determine the modification of the GUI that addresses the incident. In certain embodiments, after identifying the incident and/or generating the incident record, the interface modification system 102 may determine the modification to the GUI and/or implement the modification, as described herein.

In another example where the input data may include heart rate data of the user (e.g., received via the user's smartwatch) and/or motion data (e.g., received via the user's smartphone, smartwatch, and/or webcam), the interface modification system 102, via the incident analysis logic 124, may determine that the user's heart rate changed (e.g., increased, decreased) when viewing and/or interacting with a particular component of the GUI and/or that the user's motion (e.g., movement of head, arms, upper body) changed (e.g., increased, decreased) when viewing and/or interacting with the particular component. The interface modification system 102, via the incident analysis logic 124, may determine that there is potentially an issue with the component and may generate and store an incident record indicating the potential issue. For example, the interface modification system 102, via the incident analysis logic 124, may determine that the user's heart rate increased beyond a threshold heart rate and/or beyond a threshold percentage and determine that the user experienced stress while using a particular component of the GUI. Accordingly, the interface modification system 102, via the incident analysis logic 124, may determine that there is potentially an issue with the particular component and may generate and store an incident record indicating the potential issue in response to the user's heart rate increasing beyond threshold heart rate and/or the threshold percentage and/or in response to determining that the user experienced stress while using the particular component. In some embodiments, the interface modification system 102 may automatically determine and/or implement the modification to the GUI based on the incident, as described herein.

In certain embodiments, the interface modification system 102 may provide a modified (e.g., additional) GUI (e.g., graphical representation) to only certain client devices 104 based on the feedback being received from those client devices 104 and/or from similar client devices 104. For example, the GUI may initially be the same for all client devices, and the interface modification system 102 may customize the GUI to include different modifications for different client devices 104 and/or different groups of client devices 104.

To provide an example of the feedback and modification to an interface described above, FIG. 2 illustrates a graphical representation 200 (e.g., a GUI) of a web application, an incident record 202 corresponding to the graphical representation 200, and the incident database 106 that may store the incident record 202. The graphical representation 200 may generally display information, metrics, selectable options, and/or other aspects of the web application. For example, the graphical representation 200 includes tabs 204 (e.g., a performance tab 206, a finance tab 208, a rewards tab 210, a help tab 212, a settings tab 214). In certain embodiments, the graphical representation may include more or fewer tabs and/or tabs other than the illustrated tabs 204. One or more of the client devices 104 may display the graphical representation 200 to allow users of the client devices 104 to view and/or interact with the web application.

Figure 2:
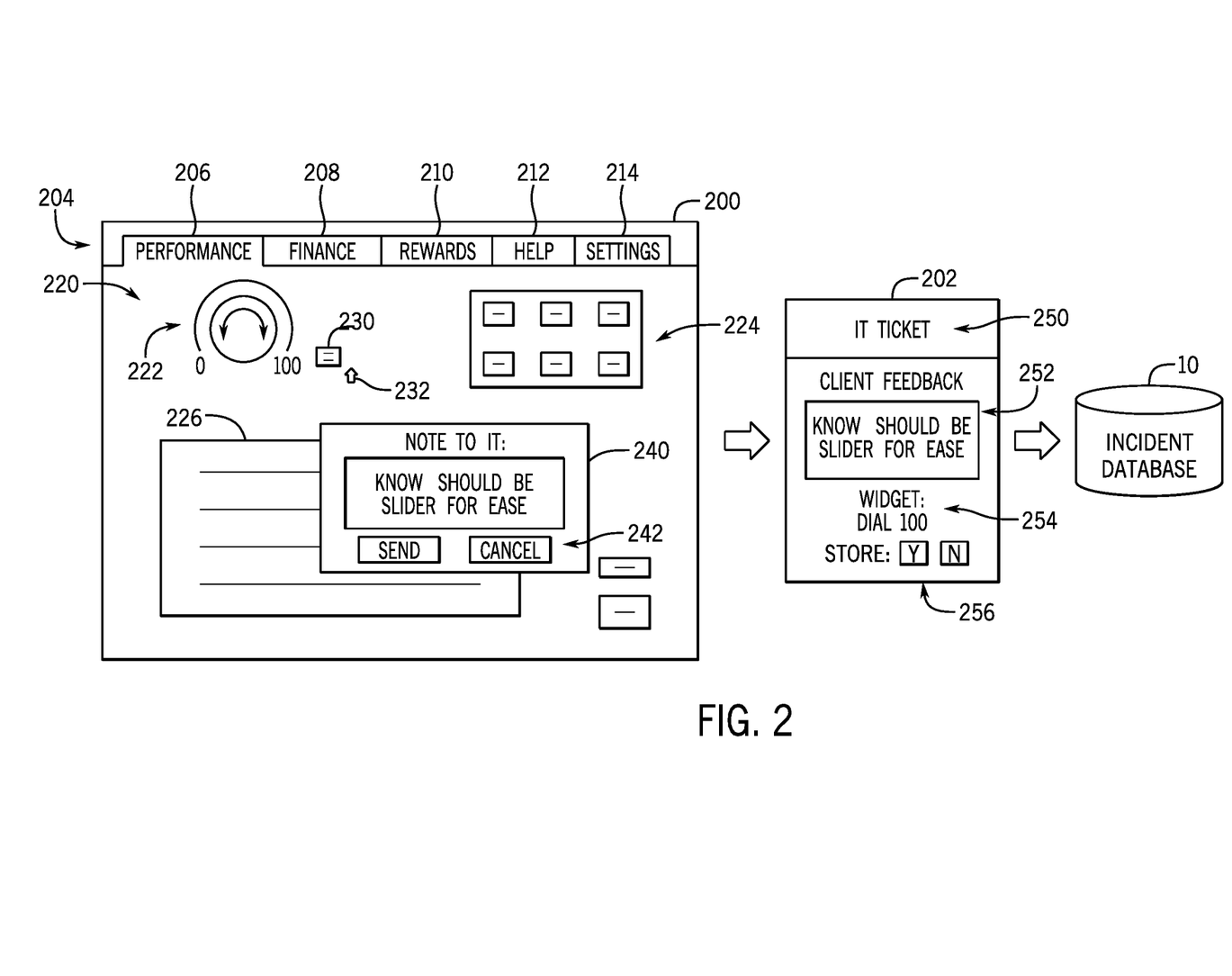
FIG. 2 illustrates a graphical representation of a web application, an incident record corresponding to the web application, and an incident database that may store the incident record, in accordance with embodiments described herein.

In the illustrated embodiment, the performance tab 206 is selected and is displaying components 220 of the web application, including a dial component 222, a panel component 224, and a document component 226, among others. The components 220 may be displayed via a first layer of the graphical representation 200, such that the user of the client device 104 may view and/or interact with the components 220 via the first layer. Additionally, the first layer may include a selectable option 230 for one or more of the components 220. As illustrated, the user has selected the selectable option 230 for (e.g., adjacent to, associated with) the dial component 222, as indicated by a mouse curser 232. The dial component 222 includes a knob that allows a user to adjust a value between 0 and 100.

Selection of the selectable option 230 may cause the graphical representation 200 to display at least a portion of a second layer including a feedback mechanism 240 for the dial component 222. Accordingly, the second layer is displayed in the illustrated embodiment. The feedback mechanism 240 is a free text field configured to allow the user of the client device 104 to provide feedback regarding the dial component 222. For example, the user may believe that the dial component 222 may function better as a slider, such as a slider that also allows the user to adjust a value between 0 and 100. Accordingly, in the illustrated embodiment, the user has entered text indicative of this feedback into the feedback mechanism 240, which includes options 242 allowing the user to send the feedback or to cancel the feedback. Selection of the send option 242 causes the feedback to be sent to the interface modification system 102. In other embodiments and/or for other components 220, the feedback mechanism may include a drop-down menu, a rating selector, or another suitable mechanism configured to allow the user to provide feedback.

In response to receiving the feedback from the client device, the interface modification system 102 may generate the incident record 202. In the illustrated embodiment, the incident record includes a title 250 (e.g., IT TICKET), the feedback of the user in a feedback section 252 (e.g., CLIENT FEEDBACK), an identifier 254 of the dial component 222 (e.g., DIAL100), and selectable options 256 allowing a user of the interface modification system 102 to approve or disapprove storing the generated incident record 202. In other embodiments, the incident record 202 may include more, fewer, and/or different sections.

In response to the user selecting the "Y" selectable option 256 (e.g., a YES option), the interface modification system 102 may store the incident record 202 in the incident database 106, thereby allowing the user to view and approve the incident record 202. The incident indicated by the incident record 202 may then be resolved by a developer and/or other technical personnel. In certain embodiments, the interface modification system 102, via the interface modification logic 122, may proceed to determine and/or implement a modification to the graphical representation 200 after receiving the feedback from the client device 104 and/or generating the incident record. For example, the interface modification logic 122 may automatically determine that the dial component 222 should be replaced by a slider component based on the feedback provided by the user. Accordingly, the interface modification logic 122 may generate and send an additional graphical representation of the web application including a slider component in place of or in addition to the dial component 222. An example of a graphical representation including a modification is described below in reference to FIG. 6.

In certain embodiments, the interface modification system 102, via the interface generation logic 120 and/or the interface modification logic 122, may traverse a markup document of the web application to determine which portions of the markup document and/or which components of the web application may potentially receive feedback from the users of the client devices 104. After identifying such components, the interface modification system 102 may insert an identifier code into the markup document that causes the client devices 104 to display the selectable option 230 for such components (e.g., the components 220 in the illustrated embodiment).

Additionally or alternatively, after the user provides the feedback to the feedback mechanism 240, a comment may be inserted into the markup document indicative of the feedback, and the markup document including the feedback may be transmitted to the interface modification system 102. Accordingly, the interface modification system 102 may traverse the markup document to determine the feedback provided by the user of the client device 104. In some embodiments, the interface modification system 102 may insert the comment into the markup document after the user provides such feedback (e.g., after the user selects the send option 242 of the feedback mechanism 240).

In certain embodiments, the interface modification system 102 may receive input data indicative of user interactions with the web application (e.g., with the graphical representation 200) from the client devices 104. The user interactions may include interactions with the tabs 204, the components 220, and/or other portions of the graphical representation 200. The incident analysis logic 124 may analyze the input data to determine a potential incident associated with the graphical representation. By way of example, the input data may indicate user interactions with the tabs 204, such as a user selecting and switching between the tabs 204. Additionally or alternatively, the input data may indicate a time period between the user interactions (e.g., a time period between selections of tabs 204).

The incident analysis logic 124 may analyze the input data to determine a potential incident. For example, the incident analysis logic 124 may determine that the user has switched back and forth between the tabs 204 without interacting further with a specific tab 204 (e.g., with a component 220 in a specific tab 204). Accordingly, the incident analysis logic 124 may determine that one or more tabs 204 are confusing to the user, that a particular component 220 and/or particular information in the tabs 204 is difficult to find and/or not present, or another suitable incident based on the input data. The incident analysis logic 124 may generate an incident record indicative of such an incident and store the incident record in the incident database 106.

Additionally or alternatively, interface modification logic 122 may determine and/or implement a modification to the graphical representation 200 based on the identified incident. For example, the interface modification logic 122 may determine that the tabs 204 should be rearranged and/or that the components 220 within the tabs 204 should be rearranged (e.g., rearranged within the same tab 204 and/or moved to other tabs 204). The interface modification system 102 provide an additional graphical representation of the web application to the client devices 104 including such a modification.

Figure 3:
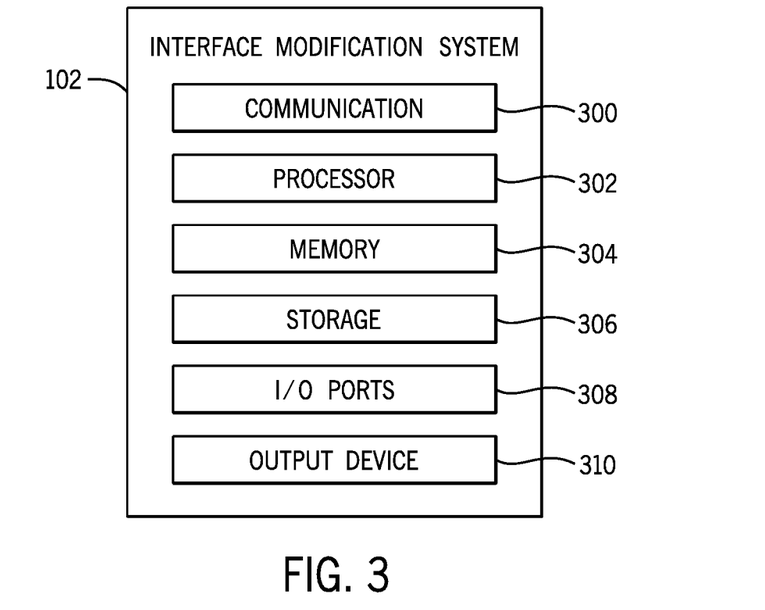
FIG. 3 illustrates a block diagram of components that may be part of the interface modification system of FIG. 1, in accordance with embodiments described herein.

FIG. 3 illustrates a block diagram of components that may be part of the interface modification system 102 of FIG. 1. For example, the interface modification system 102 may include a communication component 300, a processor 302, a memory 304, a storage 306, input/output (I/O) ports 308, an output device 310 (e.g., a display or a speaker), or any of a variety of other components that enable the interface modification system 102 to carry out the techniques described herein. The communication component 300 may be a wireless or wired communication component that may facilitate communication between the interface modification system 102, the client devices 104, the incident database 106, the interface database 108, and/or the external website database 110.

The processor 302 may be any suitable type of computer processor or microprocessor capable of executing computer-executable code. The processor 302 may also include multiple processors that may perform the operations described below. The memory 304 and the storage 306 may be any suitable articles of manufacture that can serve as media to store processor-executable code, data, or the like. These articles of manufacture may represent computer-readable medium (e.g., any suitable form of memory or storage) that may store the processor-executable code used by the processor 302 to perform the presently disclosed techniques. The memory 304 and the storage 306 may also be used to store the data, various other software applications, and the like. The memory 304 and the storage 306 may represent non-transitory computer-readable medium (e.g., any suitable form of memory or storage) that may store the processor-executable code used by the processor 302 to perform various techniques described herein. For example, the non-transitory computer-readable medium may store computer readable instructions, that when executed by the processor 302, causes the processor 302 to perform operations, such as the operations described below in reference to FIGS. 4 and 5. It should be noted that non-transitory merely indicates that the medium is tangible and not a signal.

The I/O ports 308 may be interfaces that may couple to other peripheral components such as input devices (e.g., keyboard, mouse), sensors, input/output (I/O) modules, and the like. The output device 310 may operate to depict indications associated with software or executable code processed by the processor 302. In one embodiment, the output device 310 may be an input device. For example, the output device 310 may include a touch display capable of receiving inputs from a user of the interface modification system 102. The output device 310 may be any suitable type of display, such as a liquid crystal display (LCD), plasma display, or an organic light emitting diode (OLED) display, for example. In one embodiment, the output device 310 may depict or otherwise provide the indications described above regarding the asset protection plans and adjustments to the asset protection plan. In certain embodiments, the output device 310 may include and/or may display the user interface 126. It should be noted that the components described above with regard to the interface modification system 102 are exemplary components, and the interface modification system 102 may include additional or fewer components as shown.

Figure 4:
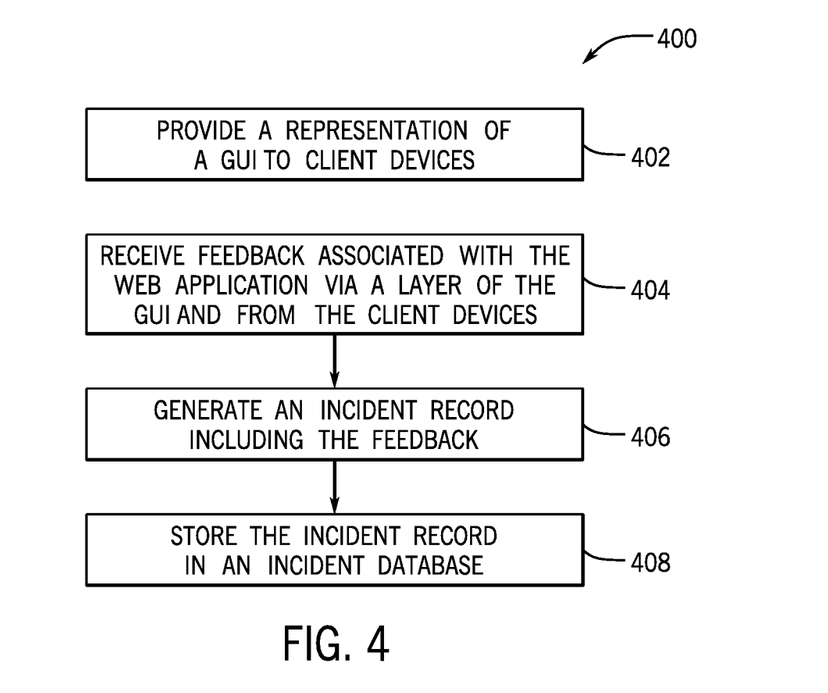
FIG. 4 illustrates a flow chart of a method for receiving feedback associated with a web application and generating and storing an incident record including the feedback, which may be performed using the interface modification system of FIG. 1, in accordance with embodiments described herein.

FIG. 4 illustrates a flow chart of a method 400 for receiving feedback associated with a web application and generating and storing an incident record including the feedback, which may be performed using the interface modification system 102 of FIG. 1. The following description of the method 400 will be described as being performed by the interface modification system 102, but it should be noted that any suitable processor-based device may be specially programmed to perform any of the methods described herein. Moreover, although the following description of the method 400 is described as including certain steps performed in a particular order, it should be understood that the steps of the method 400 may be performed in any suitable order, that certain steps may be omitted, and/or that certain steps may be added.

At block 402, the interface modification system 102, via the interface generation logic 120 and/or the interface modification logic 122, may provide a representation of a GUI (e.g., a graphical representation of a web application) to the client devices 104. For example, in reference to FIG. 2, the interface modification system 102 may provide the graphical representation 200 to the client devices 104.

At block 404, the interface modification system 102, via the incident analysis logic 124, may receive feedback associated with the web application via a second layer of the GUI and from the client devices 104. For example, the interface modification system 102 may receive the feedback shown in the feedback mechanism 240.

At block 406, the interface modification system 102, via the incident analysis logic 124, may generate an incident record including the feedback, and at block 408, store the incident record. For example, the interface modification system 102 may generate the incident record 202 and store the incident record 202 in the incident database 106.

Figure 5:
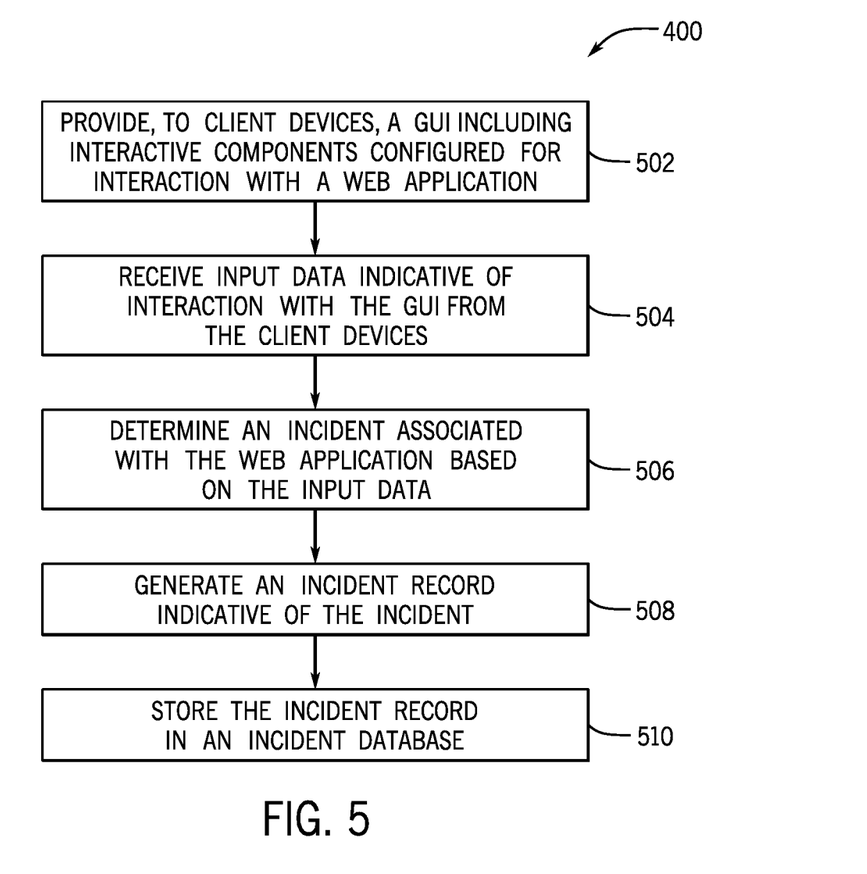
FIG. 5 illustrates a flow chart of a method for providing a graphical user interface (GUI) for a web application, receiving input data indicative of interaction with the GUI, and identifying an incident based on the input, which may be perform using the interface modification system of FIG. 1, in accordance with embodiments described herein.

FIG. 5 illustrates a flow chart of a method for providing a graphical user interface (GUI) for a web application, receiving input data indicative of interaction with the GUI, and identifying an incident based on the input, which may be perform using the interface modification system 102 of FIG. 1. The following description of the method 500 will be described as being performed by the interface modification system 102, but it should be noted that any suitable processor-based device may be specially programmed to perform any of the methods described herein. Moreover, although the following description of the method 500 is described as including certain steps performed in a particular order, it should be understood that the steps of the method 500 may be performed in any suitable order, that certain steps may be omitted, and/or that certain steps may be added.

At block 502, the interface modification system 102, via the interface generation logic 120 and/or the interface modification logic 122, may provide, to the client devices 104, a GUI including interactive components configured for interaction with a web application. For example, in reference to FIG. 2, the interface modification system 102 may provide the graphical representation 200 to the client devices 104.

At block 504, the interface modification system 102, via the incident analysis logic 124, may receive input data indicative of interaction with the GUI from the client devices 104. For example, the interface modification system 102 may receive input data indicative of user interactions with the tabs 204, the components 220 in the tabs 204, and/or other portions of the graphical representation 200 of FIG. 2.

At block 506, the interface modification system 102, via the incident analysis logic 124, may determine an incident associated with the web application based on the input data. For example, based on the user interactions with the tabs 204 and/or the components 220, the interface modification system 102 may determine a potential incident with the graphical representation 200, such as an incident associated with a particular tab 204 and/or a particular component 220 for which a user is having an issue (e.g., the incident may identify a potential issue and/or improvement for the tab 204 and/or the component 220).

At block 508, the interface modification system 102, via the incident analysis logic 124, may generate an incident record including the feedback, and at block 510, store the incident record. For example, the interface modification system 102 may generate an incident record indicating the potential issue with the particular tab 204 and/or the particular component 220 and store the incident record in the incident database 106.

Figure 6:
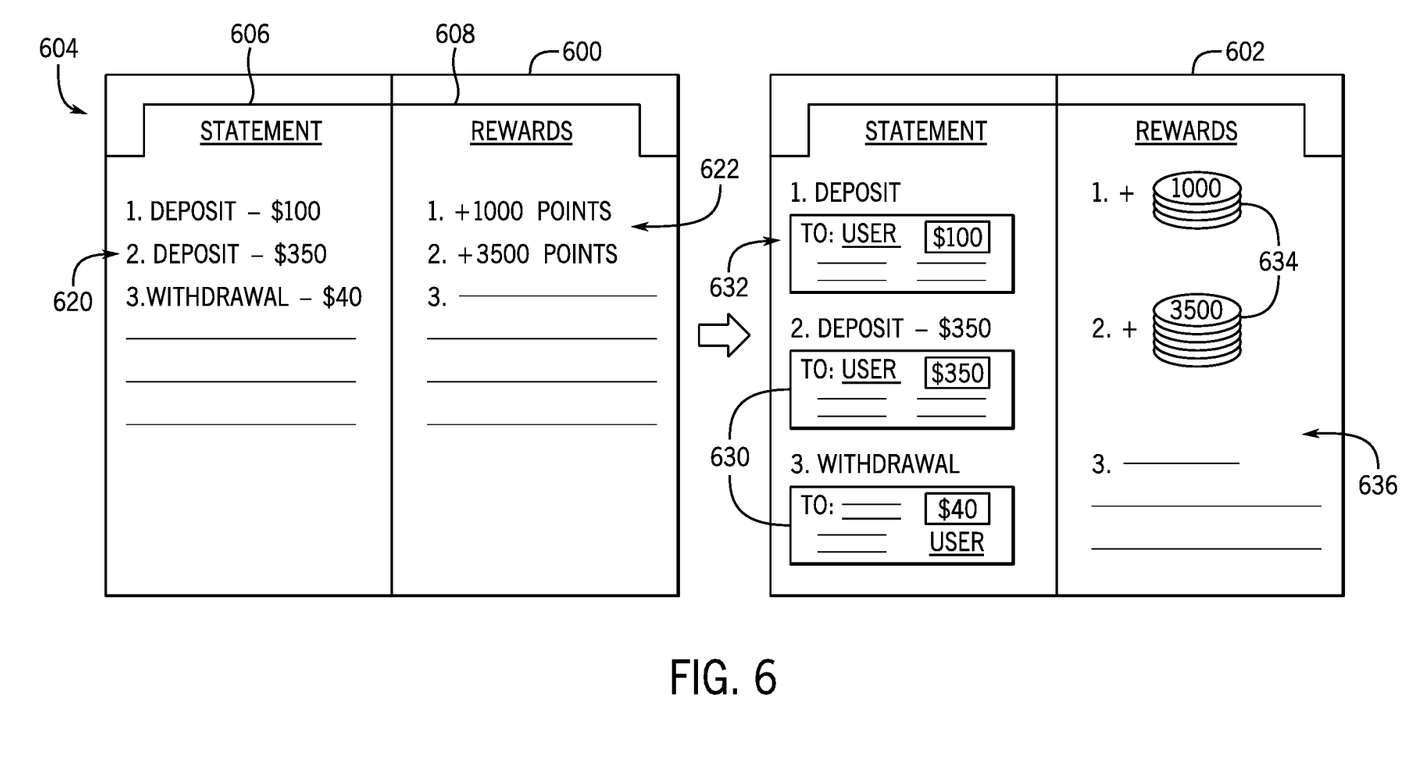
FIG. 6 illustrates graphical representations of a web application before and after a modification, which may be implemented using the interface modification system of FIG. 1 and/or implemented based on an incident record generated using the interface modification system of FIG. 1, in accordance with embodiments described herein.

FIG. 6 illustrates a graphical representation 600 and an additional graphical representation 602 of a web application before and after a modification, respectively, which may be implemented using the interface modification system 102 of FIG. 1 and/or implemented based on an incident record generated using the interface modification system 102 of FIG. 1. The graphical representation 600 may generally display information, metrics, selectable options, and/or other aspects of the web application. For example, the graphical representation 600 includes tabs 604 (e.g., a statement tab 606, a rewards tab 608). In certain embodiments, the graphical representation 600 may include more or fewer tabs and/or tabs other than the illustrated tabs 604. One or more of the client devices 104 may display the graphical representation 600 to allow users of the client devices 104 to view and/or interact with the web application.

The graphical representation 600 may generally be for a user's bank, such that the graphical representation 600 may be provided by the bank or by a third party on behalf of the bank. In the illustrated embodiment, the graphical the statement tab 606 includes a listing 620 of deposits and withdrawals in a text format. The deposits generally indicate monetary additions/increases to a balance of a user's account, and the withdrawals may generally indicated monetary subtractions/decreases to the account. Additionally, the rewards tab 608 includes a listing 622 of additions to points in a text format that correspond to the deposits of the listing 620 in the statement tab 606. For example, the points may be earned by the user for making deposits to the account. In certain embodiments, the points may be earned for withdrawals from the account and/or for expenditures from the account. The points may be used by the user for travel coupons and/or other suitable rewards.

A user of the graphical representation 600 may provide feedback regarding the portion(s) of the graphical representation 600, such as the statement tab 606, the rewards tab 608, the listing 620, and/or the listing 622. For example, the user may not understand what "DEPOSIT" and/or "WITHDRAWAL" mean/indicate in the listing 620 and/or what "POINTS" means/indicates in the listing 622. The user may provide feedback via a feedback mechanism (e.g., a data entry field configured to receive a text entry, a rating selector configured to receive a rating, a drop-down menu) indicating that they do not understand these aspects of the graphical representation 600. The interface modification system 102 may receive the feedback, generate an incident record including the feedback, and/or store the incident record in the incident database 106.

The incident record may be presented to a user of the interface modification system 102, such as via the user interface 126, and the user may determine and/or generate a modification to the graphical representation 600 that addresses the feedback. For example, the user may determine that adding graphical elements to the graphical representation 600 and/or replacing portions of the graphical representation 600 with such graphical elements may address the feedback (e.g., may improve a client device user's understanding of the terms "deposit", "withdrawal", and/or "points"). In the illustrated embodiment, the user may determine that graphical elements 630 shown in a listing 632 of the additional graphical representation 602 may address the feedback, and/or that graphical elements 634 shown in a listing 636 of the additional graphical representation 602 may address the feedback. Accordingly, the user may generate the additional graphical representation 602 including this modification, and the additional graphical representation 602 may be transmitted to the client devices 104, thereby providing an interface that the user of the client device 104 may better understand. In certain embodiments, the user may provide only the modification to the graphical representation 600, and the interface modification logic 122 may generate the additional graphical representation 602 including the modification.

Additionally or alternatively, the interface modification system 102 may automatically determine the modification to the graphical representation based on the feedback. For example, the interface modification system 102 may determine (e.g., via machine learning) that providing the graphical elements 630 and/or 634 would address the feedback by provided by the user of the client device 104. As such, the interface modification logic 122 may generate the additional graphical representation 602 including the modification and/or transmit the additional graphical representation 602 to the client device 104 for viewing and/or interaction by the user.

Accordingly, the web application system, via the interface modification system described herein, may provide a graphical representation (e.g., a GUI) of a web application to client devices, receive feedback associated with the web application from the client devices, and generate and store an incident record including the feedback. For example, the graphical representation may include a second (e.g., additional, background) layer that allows users to provide feedback via feedback mechanisms. The interface modification system may allow a user to determine and/or generate a modification to the graphical representation based on the feedback, and/or the interface modification system may automatically determine and/or generate the modification. The interface modification system may provide an additional graphical representation (e.g., an additional representation of the GUI) including the modification to the client device, thereby allowing the user of the client device to view and/or interact with the modified, additional graphical representation. Accordingly, the web application system, via the interface modification system, may facilitate improvements to interfaces, thereby providing users of such interfaces improved and faster interface experiences.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An interface modification system comprising one or more processors configured to:
provide, to one or more client devices, a graphical representation of a web application, wherein the graphical representation comprises:
a first layer comprising one or more components of the web application;
a graphical feedback affordance associated with a particular component of the one or more components of the web application; and
a second layer configured to render upon selection of the graphical feedback affordance, the second layer specific to the particular component and configured to receive feedback associated with the particular component of the one or more components, independent of selection of the particular component within the graphical representation;
receive, via the second layer and from the one or more client devices, the feedback associated with the particular component of the one or more components;
perform machine learning on the feedback to identify, via the machine learning, a modification to the one or more components of the first layer based on the feedback, wherein the modification comprises one or more alternative components to replace the particular component of the one or more components of the first layer; and
generate a ticket comprising instructions to implement the modification.

2. The interface modification system of claim 1, wherein the one or more processors are configured to:
traverse a markup document of the web application to identify the one or more components of the web application; and
insert an identifier code into the markup document for each of the one or more components.

3. The interface modification system of claim 2, wherein the first layer comprises graphical feedback affordances for each of the one or more components, and wherein the identifier code for each of the one or more components causes the one or more client devices to display an associated portion of the second layer comprising a feedback mechanism for a respective one of the one or more components, associated with a selected identifier code.

4. The interface modification system of claim 3, wherein the feedback mechanism comprises a data entry field configured to receive a text entry, a rating selector configured to receive a rating, a drop-down menu, or a combination thereof.

5. The interface modification system of claim 2, wherein the feedback associated with the web application comprises particular feedback for at least one of the one or more components, wherein the one or more processors are configured to generate a comment in the markup document for the at least one of the one or more components, and wherein the comment is indicative of the particular feedback.

6. The interface modification system of claim 1, wherein the one or more processors are configured to generate an additional graphical representation of the web application, and wherein the additional graphical representation comprises the modification.

7. The interface modification system of claim 6, wherein the one or more processors are configured to provide, to the one or more client devices, the additional graphical representation.

8. The interface modification system of claim 1, wherein the one or more client devices comprises a plurality of client devices, and wherein the one or more processors are configured to:

determine that the feedback is received from a threshold number of client devices of the plurality of client devices; and generate an incident record in response to determining that the feedback is received from the threshold number of client devices.

9. The interface modification system of claim 8, wherein the one or more processors are configured to determine the threshold number of client devices based on a type of the feedback, a significance of the feedback, an amount of the plurality of client devices, or a combination thereof.

10. The interface modification system of claim 1, wherein the one or more client devices comprises a plurality of client devices, and wherein the one or more processors are configured to:

aggregate the feedback received from the plurality of client devices;

determine that the feedback received from at least two client devices of the plurality of client devices exceeds a threshold level of similarity; and generate an incident record in response to determining that the feedback received from the at least two client devices exceeds the threshold level of similarity.

11. The interface modification system of claim 1, wherein the first layer is configured for primary interactions with the one or more components.

12. A method, comprising:

providing, to one or more client devices, a graphical representation of a web application, wherein the graphical representation comprises:

a first layer comprising one or more components of the web application;

a graphical feedback affordance associated with a particular component of the one or more components of the web application; and a second layer configured to render upon selection of the graphical feedback affordance, the second layer specific to the particular component and configured to receive feedback associated with the particular component of the one or more components, independent of selection of the particular component within the graphical representation;

receiving, via the second layer and from the one or more client devices, the feedback associated with the particular component of the one or more components;

performing machine learning on the feedback to identify, via the machine learning, a modification to the one or more components of the first layer based on the feedback; and implementing, via the machine learning, the modification to the particular component of the one or more components of the first layer.

13. The method of claim 12, comprising:

traversing a markup document of the web application to identify the one or more components of the web application; and inserting an identifier code into the markup document for each of the one or more components.

14. The method of claim 12, comprising:

generating an additional graphical representation of the web application, and wherein the additional graphical representation comprises the modification.

15. The method of claim 14, comprising:

providing, to the one or more client devices, the additional graphical representation.

16. A non-transitory computer-readable medium comprising computer readable instructions, that when executed by one or more processors, causes the one or more processors to perform operations comprising:

providing, to one or more client devices, a graphical representation of a web application, wherein the graphical representation comprises:

a first layer comprising one or more components of the web application;

a graphical feedback affordance associated with a particular component of the one or more components of the web application; and a second layer configured to render upon selection of the graphical feedback affordance, the second layer specific to the particular component and configured to receive feedback associated with the particular component of the one or more components, independent of selection of the particular component within the graphical representation;

receiving, via the second layer and from the one or more client devices, the feedback associated with the particular component of the one or more components;

performing machine learning on the feedback to identify, via the machine learning, a modification to the one or more components of the first layer based on the feedback, wherein the modification comprises one or more alternative components to replace the particular component of the one or more components of the first layer; and generating a ticket comprising instructions to implement the modification.

17. The non-transitory computer-readable medium of claim 16, wherein the one or more client devices comprises a plurality of client devices, and wherein the operations comprise:

determining that the feedback is received from a threshold number of client devices of the plurality of client devices; and generating an incident record in response to determining that the feedback is received from the threshold number of client devices.

18. The non-transitory computer-readable medium of claim 17, wherein the operations comprise determining the threshold number of client devices based on a type of the feedback, a significance of the feedback, an amount of the plurality of client devices, or a combination thereof.

* * * * *